US009148294B2

United States Patent
Hasesaka et al.

(10) Patent No.: US 9,148,294 B2
(45) Date of Patent: Sep. 29, 2015

(54) SYSTEM AND METHOD FOR SWITCHING A COMMUNICATION PATH BASED ON DISASTER INFORMATION

(71) Applicant: FUJITSU LIMITED, Kawasaki-shi, Kanagawa (JP)

(72) Inventors: Kiyomi Hasesaka, Kawasaki (JP); Tatsuhiro Ando, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 362 days.

(21) Appl. No.: 13/690,539

(22) Filed: Nov. 30, 2012

(65) Prior Publication Data

US 2013/0163603 A1 Jun. 27, 2013

(30) Foreign Application Priority Data

Dec. 26, 2011 (JP) ................................ 2011-283575

(51) Int. Cl.
H04L 12/28 (2006.01)
H04L 12/707 (2013.01)
H04L 12/703 (2013.01)

(52) U.S. Cl.
CPC .............. H04L 12/28 (2013.01); H04L 45/22 (2013.01); H04L 45/28 (2013.01)

(58) Field of Classification Search
IPC .............. H04W 4/22,76/007, 4/02, 4/18, 64/00,
H04W 68/00, 84/18, 88/04, 12/06, 12/10,
H04W 24/00, 24/02, 24/04, 24/10, 28/04,
H04W 28/08, 28/24, 36/08, 48/08, 48/10,
H04W 48/16, 4/005, 4/021, 4/06, 4/14, 4/20,
H04W 64/003, 76/02, 84/042, 84/045, 84/06,
H04W 84/12, 88/08, 88/16, 8/005, 8/06,
H04W 8/245, 92/02; H04H 20/59, 40/27
See application file for complete search history.

(56) References Cited

U.S. PATENT DOCUMENTS

| 7,848,981 | B2 * | 12/2010 | Bertogg | 705/35 |
| 2007/0233390 | A1 * | 10/2007 | Freund | 702/15 |
| 2009/0033511 | A1 * | 2/2009 | Komiya et al. | 340/690 |
| 2011/0270793 | A1 * | 11/2011 | Bertogg | 706/50 |
| 2011/0280381 | A1 * | 11/2011 | Okamoto et al. | 379/37 |
| 2012/0163562 | A1 * | 6/2012 | Takuno et al. | 379/46 |
| 2013/0163603 | A1 * | 6/2013 | Hasesaka et al. | 370/401 |

FOREIGN PATENT DOCUMENTS

| JP | 2008-061196 | 3/2008 |
| JP | 2010-245702 | 10/2010 |

OTHER PUBLICATIONS

Japanese Office Action mailed Jul. 7, 2015 in related Japanese Application No. 2011-283575.

* cited by examiner

*Primary Examiner* — Fan Ng
(74) *Attorney, Agent, or Firm* — Staas & Halsey LLP

(57) ABSTRACT

A relay apparatus transfers data sent from a user terminal, to an external network, via any one of paths. A notification apparatus receives first disaster information including area information identifying first areas forecast to be affected by an occurrence of a disaster and prediction information storing, in association with each of the first areas, a predicted intensity value indicating a predicted value of an influence degree of the disaster on the each of the first areas. The notification apparatus generates, based on the first disaster information, second disaster information storing the predicted intensity value in association with each of second areas passed through by the paths. The relay apparatus switches the currently-used path to alternative path when it is determined that the predicted intensity value associated with at least one of third areas passed through by the currently-used path is greater than or equal to the predetermined threshold value.

11 Claims, 13 Drawing Sheets

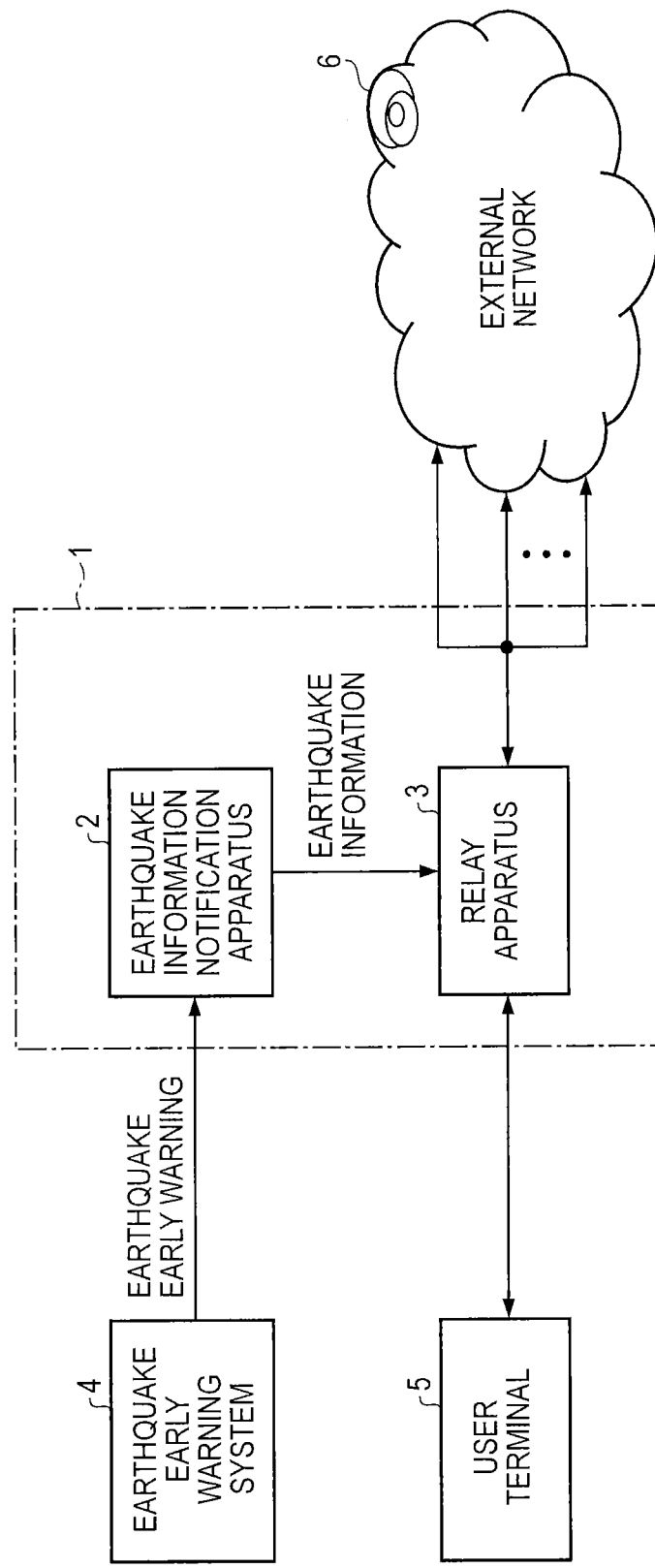

FIG. 4

| RELAY APPARATUS ID | IP ADDRESS | LATITUDE | LONGITUDE |
|---|---|---|---|
| 1001 | A | n1 | m1 |
| 1002 | B | n2 | m2 |
| 1003 | C | n3 | m3 |
| 1004 | D | n4 | m4 |
| 1005 | E | n5 | m5 |
| ⋮ | ⋮ | ⋮ | ⋮ |

FIG. 5

| EARTHQUAKE ID | MAGNITUDE | AREA INFORMATION | PREDICTED SEISMIC INTENSITY |
|---|---|---|---|
| 10012 | 7.2 | X00 | 6 |
| 10012 | 7.2 | X01 | 6 |
| 10012 | 7.2 | X02 | 5 LOWER |
| ⋮ | ⋮ | ⋮ | ⋮ |

FIG. 6

| SAI | AREA INFORMATION |
|---|---|
| X0 | X00 |
| X1 | X00, X01 |
| X2 | X02 |
| ⋮ | ⋮ |

| COMMUNICATION PATH ID | PRIORITY | NUMBER OF HOPS N | SAI(0) | SAI(1) | ... |
|---|---|---|---|---|---|
| #1 | 0 | 7 | 10 | 11 | ... |
| #2 | 1 | 8 | 20 | 21 | ... |
| #3 | 2 | 15 | X0 | X1 | ... |
| ⋮ | ⋮ | ⋮ | ⋮ | ⋮ | ⋮ |

FIG. 14

| COMMUNICATION PATH ID | PRIORITY | NUMBER OF HOPS N | SAI(0) | WEIGHTING FACTOR Gd(1) | SAI(1) | WEIGHTING FACTOR Gd(2) | ... |
|---|---|---|---|---|---|---|---|
| #1 | 0 | 7 | 10 | 1.0 | 11 | 1.1 | ... |
| #2 | 1 | 8 | 20 | 1.0 | 21 | 1.1 | ... |
| #3 | 2 | 15 | X0 | 1.3 | X1 | 1.3 | ... |
| ... | ... | ... | ... | ... | ... | ... | ... |

SYSTEM AND METHOD FOR SWITCHING A COMMUNICATION PATH BASED ON DISASTER INFORMATION

CROSS-REFERENCE TO RELATED APPLICATION

This application is based upon and claims the benefit of priority of the prior Japanese Patent Application No. 2011-283575, filed on Dec. 26, 2011, the entire contents of which are incorporated herein by reference.

FIELD

The embodiments discussed herein are related to a system and method for switching a communication path based on disaster information.

BACKGROUND

Earthquake early warning systems are working in recent years. The earthquake early warning systems, upon occurrences of earthquakes, analyze data that are observed by seismographs installed at points near focuses of the earthquakes, estimate the focuses of the earthquakes and the magnitudes of the earthquakes, and predict seismic intensities and the arrival times of tremors at the respective points on the basis of the results of the estimations.

Upon occurrence of an earthquake, a small tremor (a longitudinal wave) called a minor initial tremor, or a primary wave (P wave), and a large tremor (a transverse wave) called a principal motion, or a secondary wave (S wave), occur at the focus of the earthquake. The propagation velocity of the P wave is about seven km/sec while the propagation velocity of the S wave is about four km/sec.

In such an earthquake early warning system, the behavior of the S wave is predicted, by utilizing difference in the propagation velocities between the P wave and the S wave, based on the observation data about the P wave at points near the focus of the earthquake. Accordingly, for example, at a point apart from the focus of the earthquake by a certain distance or more (at a point where there is a large difference between the arrival times of the P wave and the S wave), it is possible to predict the magnitude of the earthquake and the arrival time of the tremor before the S wave arrives at the point.

For example, as illustrated in FIG. 1A, upon occurrence of an earthquake, out of the P wave and the S wave that have occurred at the focus of the earthquake, the P wave is observed by a seismograph 200 prior to the S wave. Data about the P wave observed by the seismograph 200 is transmitted to, for example, a National Weather Service 100.

The National Weather Service 100 estimates, for example, the focus and the magnitude of the earthquake based on the data observed by the seismograph 200, and predicts the seismic intensity and the arrival time of the tremor in each area based on the result of the estimation.

As illustrated in FIG. 1B, earthquake early warning including information concerning, for example, the seismic intensity and the arrival time of the tremor in each area, which are predicted by the National Weather Service 100, is transmitted to a system user, such as a cell broadcast center (CBC) 300. Thereafter, for example, earthquake information generated based on the earthquake early warning is secondarily distributed to each end user by the CBC 300.

For example, in a typical third-generation (3G) communication system, the earthquake early warning is transmitted from the National Weather Service 100 to the CBC 300 upon occurrence of an earthquake. The CBC 300 determines a distribution area of the earthquake information, based on the information concerning, for example, the seismic intensity and the predicted arrival time of the tremor in each area, which is included in the received earthquake early warning, and generates the earthquake information to be distributed to users in the distribution area. Then, the CBC 300 transmits the generated earthquake information to a serving General Packet Radio Service (GPRS) support node (SGSN). The SGSN receives the earthquake information transmitted from the CBC 300 and notifies mobile stations (MSs) in the distribution area of the received earthquake information via a radio network controller (RNC) and a base station (BS).

For example, in a typical Long Term Evolution (LTE) communication system, the earthquake early warning information is transmitted from the National Weather Service 100 to the CBC 300 upon occurrence of an earthquake. The CBC 300 determines a distribution area of the earthquake information, based on the information concerning, for example, the seismic intensity and the arrival time of the tremor in each area, which is included in the received earthquake early warning, and generates the earthquake information to be distributed to the users in the distribution area. Then, the CBC 300 transmits the generated earthquake information to a mobility management entity (MME). Each eNodeB (eNB) arranged in the LTE communication system receives the earthquake information from the MME and notifies the MSs in the distribution area of the earthquake information.

Methods of distributing the earthquake information include a Cell Broadcast Service (CBS) method and an Earthquake and Tsunami Warning System (ETWS) method.

For example, Japanese Laid-open Patent Publication No. 2010-245702 proposes a communication apparatus that behaves in accordance with a disaster scenario that identifies the status of a disaster. Japanese Laid-open Patent Publication No. 2008-61196 proposes a system that extracts a path that is disconnected on the basis of any fault portion that has been caused upon occurrence of a disaster to build a bypass path of the extracted disconnected path.

SUMMARY

According to an aspect of the invention, a system for switching a communication path based on disaster information is provided. A relay apparatus transfers data sent from a user terminal, to an external network, via any one of a plurality of communication paths. An information notification apparatus transmits, when a disaster has occurred, information on the occurred disaster to the relay apparatus. The information notification apparatus is configured to receive first disaster information including area information and prediction information where the area information identifies first areas that are forecast to be affected by an occurrence of the disaster, and the prediction information stores, in association with each of the first areas, a predicted intensity value indicating a predicted value of an influence degree of the disaster on the each of the first areas. The information notification apparatus generates, based on the received first disaster information, second disaster information storing the predicted intensity value for the disaster in association with each of second areas that are included in the first areas and are passed through by the plurality of communication paths. The information notification apparatus transmits the generated second disaster information to the relay apparatus. The relay apparatus receives the second disaster information, and determines, based on the received second disaster information, whether or not a first predicted intensity value associated with at least one of third areas is greater than or equal to a predetermined threshold value, where the third areas are areas passed through by a first communication path that is currently used one of the plurality of communication paths. The relay apparatus switches the first communication path to a second communication path that is alternative one of the plurality of communication paths when it is determined that the first predicted intensity value is greater than or equal to the predetermined threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a configuration example of a communication system, according to an embodiment;

FIG. 4 is a diagram illustrating an example of a relay apparatus information database, according to an embodiment;

FIG. 5 is a diagram illustrating an example of a seismic intensity information database, according to an embodiment;

FIG. 6 is a diagram illustrating an example of a service area identifier (SAI) information database, according to an embodiment;

FIG. 14 is a diagram illustrating an example of a path information database, according to an embodiment;

DESCRIPTION OF EMBODIMENTS

Figure 1A:
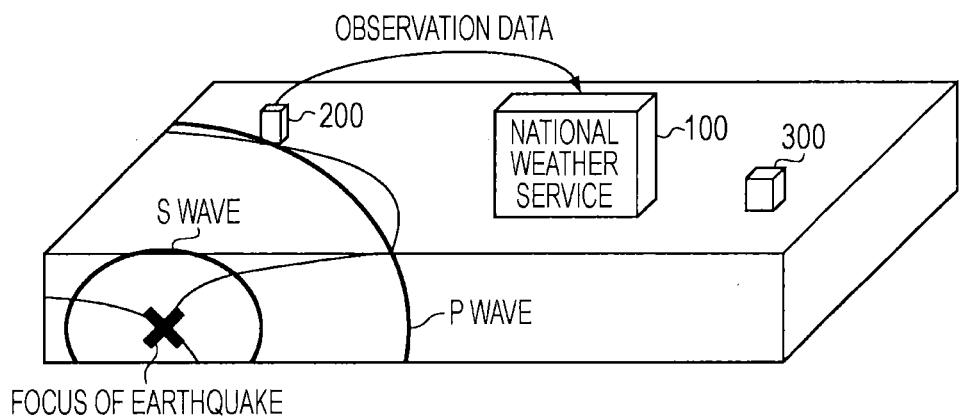
FIG. 1A and FIG. 1B are schematic diagrams each illustrating an earthquake early warning system.
Figure 1B:
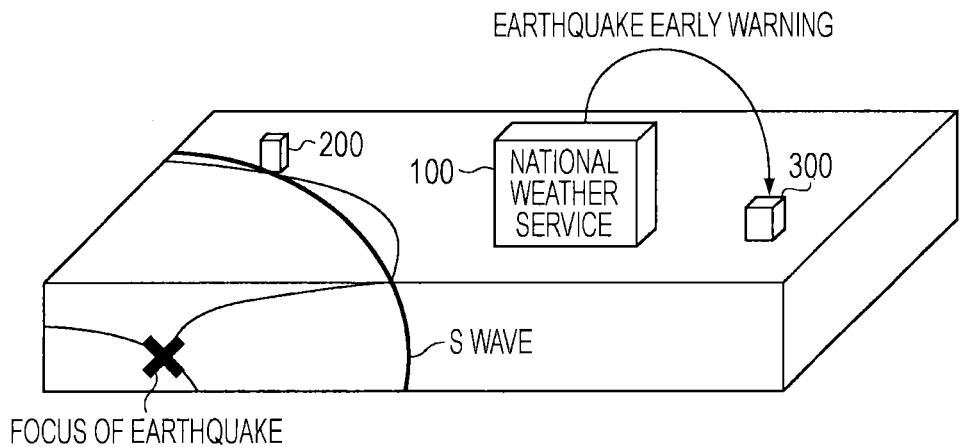

Since communication networks in communication systems are important lifelines for rescue of disaster victims and confirmation of the safety thereof upon occurrences of disasters, such as an earthquake, the recovery times are preferably reduced and failure avoidance functions are preferably provided. However, in the above mentioned related arts, since only a failure that has occurred in a communication apparatus or a communication line composing a network is detected to build a bypass path, there may be cases where the recovery times are increased or the failures are not avoided in advance.

Exemplary embodiments of the present disclosure will herein be described with reference to the attached drawings. While the present disclosure is described in terms of some specific examples and embodiments, it will be clear that the present disclosure is not limited to these specific examples and embodiments and that many changes and modified embodiments will be obvious to those skilled in the art without departing from the true spirit and scope of the present disclosure. In the following examples, an earthquake will be used as an exemplary disaster. However, the embodiments are applied to the cases in which various disasters, such as a tsunami (seismic sea waves), a fire disaster, or a flood, have occurred.

[1] Exemplary Embodiments (1.1) Example of Configuration of Communication System According to an Exemplary Embodiment FIG. 2 is a diagram illustrating a configuration example of a communication system, according to an embodiment. In the example of FIG. 2, in which an earthquake is used as an exemplary disaster, the communication system 1 includes, for example, at least one earthquake information notification apparatus 2 and at least one relay apparatus 3. The communication system 1 is connected to an earthquake early warning system 4 and at least one user terminal 5. The communication system 1 is connected to an external network 6, such as an Internet protocol (IP) network, via a plurality of communication paths. In the case of earthquake, a seismic intensity is used as a value indicating an influence degree of the disaster.

Upon occurrence of an earthquake, the earthquake early warning system 4 predicts, for example, the focus of the earthquake, the magnitude of the earthquake, the seismic intensity, and the arrival time of the tremor, in each area, based on the observation data about the minor initial tremor (the P wave) of the earthquake, and transmits, as first disaster information, an earthquake early warning obtained based on the result of the prediction to the earthquake information notification apparatus 2. The earthquake early warning may include information concerning the arrival time of tremor in each area, in addition to, for example, area information for identifying areas where the tremor caused by the earthquake is estimated to occur and a predicted value of the seismic intensity in each area.

The earthquake information notification apparatus 2 extracts the predicted values of the seismic intensity in areas that are passed through by the plurality of communication paths between the relay apparatus 3 and the external network 6, from the earthquake early warning received from the earthquake early warning system 4. Then, the earthquake information notification apparatus 2 generates, as second disaster information, earthquake information including the extracted information, and transmits the generated earthquake information to the relay apparatus 3.

The user terminal 5 transmits data, such as user data and control data, to the external network 6 via the relay apparatus 3. The user terminal 5 receives a variety of data from the external network 6 via the relay apparatus 3. In addition, the user terminal 5 is configured to receive the earthquake information transmitted from the earthquake information notification apparatus 2.

The relay apparatus 3 receives a variety of data transmitted from the user terminal 5 and relays the received variety of data to the external network 6 via one of the plurality of communication paths. Further, the relay apparatus 3 receives the variety of data transmitted from the external network 6 via the one of the plurality of communication paths, and transmits the received variety of data to the user terminal 5.

The user terminal 5 and the relay apparatus 3 are configured to be communicably coupled via various networks, such as a 3G network, an LTE network, and an optical network.

For example, a mobile station (MS) serving as the user terminal 5, a base station apparatus (BS) that establishes wireless communication with the MS, a base station control apparatus (RNC) that controls the BS, an apparatus (SGSN) that controls a variety of information including protocol information and IP addresses, a gateway apparatus (gateway GPRS support node (GGSN)) connected to the external network 6, and a database apparatus (home location register (HLR)) that manages user information including mobile phone numbers and terminal identification numbers may be arranged in the 3G network.

For example, User Equipment (UE) serving as the user terminal 5, a base station apparatus (eNB) that establishes wireless communication with the UE, a node (a serving gateway (SGW)) that realizes a relay function of the user data, a gateway apparatus (a packet data network gateway (PGW)) connected to the external network 6, a node (MME) that performs management including registration of the position of the UE, calling, and handover between the base stations, and a database apparatus (home subscriber server (HSS)) that manages the user information including mobile phone numbers and terminal identification numbers may be arranged in the LTE network.

For example, an optical network unit (ONU) serving as the user terminal 5 and an optical line terminal (OLT) that establishes optical communication with the ONU via an optical splitter may be arranged in the optical network.

The relay apparatus 3 according to the embodiment switches the currently-used communication path when the predicted value of the seismic intensity in at least one of the areas through which the currently-used communication path passes is higher than or equal to a predetermined threshold value, based on the earthquake information received from the earthquake information notification apparatus 2. The plurality of communication paths may include at least one of, for example, the 3G network, the LTE network, the optical network, and a network for offload communication.

According to the embodiment, since an occurrence of a failure caused by an earthquake is predicted and the currently-used communication path is switched in advance, it is possible to reduce the recovery time of the system. In addition, it is possible to avoid an occurrence of a system failure in advance.

Furthermore, since a currently-used communication path is switched on the basis of failure prediction in areas through which the currently-used communication path passes, it is possible to reduce the time to switch the currently-used communication path, compared with path switching based on the failure prediction in communication apparatuses through which the currently-used communication path passes.

Subscriber information held in the HLR, HSS, or the like may be saved in, for example, a database apparatus positioned in an area other than a disaster-stricken area when the currently-used communication path is switched. In this case, it is possible to create a missing list in widespread disaster on the basis of the subscriber information and to use the missing list for salvation of missing persons.

In the above example, an earthquake is used as a representative disaster, and seismic intensity is used as an influence degree of the disaster. However, in the case of other disasters, values other than the seismic intensity may be used as influence degrees of the other disasters.

Examples of the configurations of the earthquake information notification apparatus 2 and the relay apparatus 3 and an exemplary operation of the communication system 1 will be described below.

Figure 3:
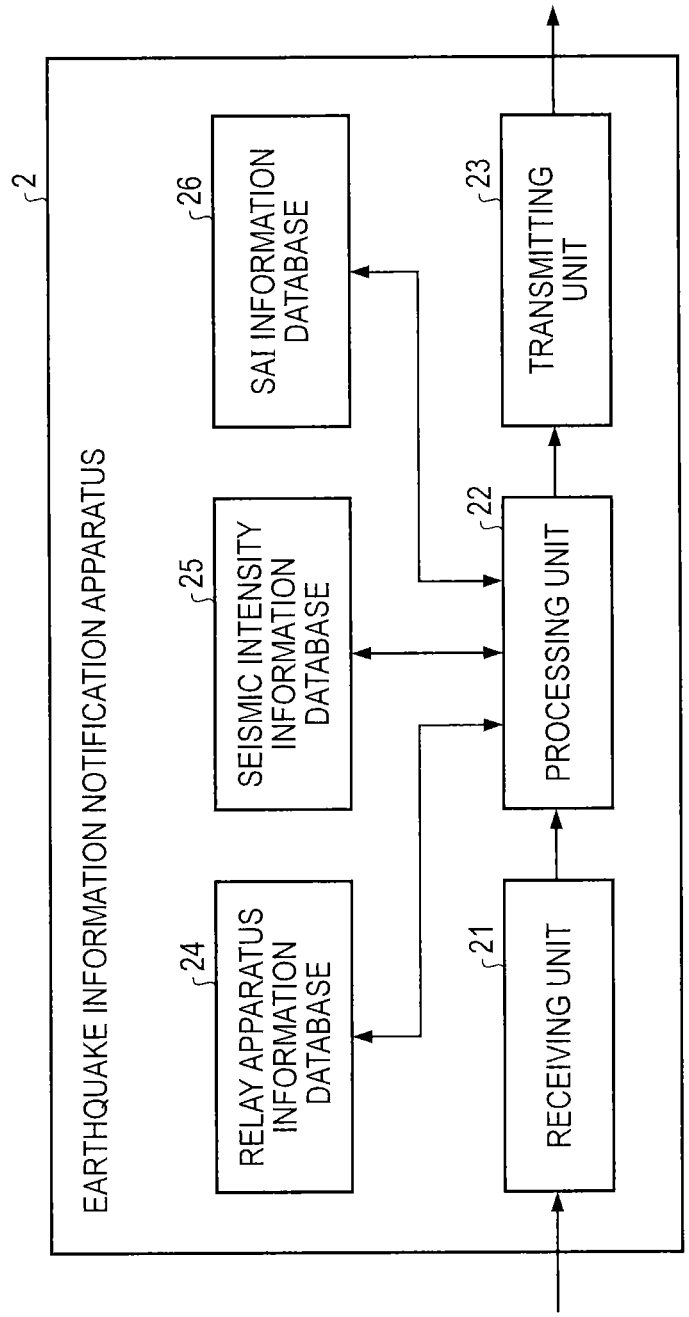
FIG. 3 is a diagram illustrating a configuration example of an earthquake information notification apparatus, according to an embodiment.

(1.2) Example of Configuration of an Earthquake Information Notification Apparatus FIG. 3 is a diagram illustrating a configuration example of an earthquake information notification apparatus, according to an embodiment. As depicted in FIG. 3, the earthquake information notification apparatus 2 may be configured to include a receiving unit 21, a processing unit 22, a transmitting unit 23, a relay apparatus information database 24, a seismic intensity information database 25, and a service area identifier (SAI) information database 26.

The receiving unit 21 receives, as first disaster information, the earthquake early warning from the earthquake early warning system 4. The earthquake early warning includes, for example, the area information for identifying areas where tremors caused by the earthquake are estimated to occur and the predicted values of the seismic intensities in the respective sreas. The earthquake early warning may include, in addition to the above information, information concerning the arrival times of the tremors in the respective areas.

The relay apparatus information database 24 holds identification information for identifying each of the relay apparatuses 3 in association with information indicating the destination of each relay apparatus 3. For example, the relay apparatus information database 24 holds a table as illustrated in FIG. 4, which at least includes relay apparatus identifiers (IDs) (for example, "1001", "1002", "1003", "1004", "1005", . . . ) identifying the respective relay apparatuses 3 and IP addresses (for example, "A", "B", "C", "D", "E", . . . ) of the respective relay apparatuses 3. In this way, the relay apparatus IDs are associated with the IP addresses in the table in FIG. 4.

The relay apparatus information database 24 may further hold the latitudes (for example, "n1", "n2", "n3", "n4", "n5", . . . ) of the respective relay apparatuses 3 and the longitudes (for example, "m1", "m2", "m3", "m4", "m5", . . . ) of the respective relay apparatuses 3 as positional information about the respective relay apparatuses 3, as illustrated in FIG. 4. The content of the relay apparatus information database 24 is generated or updated by a system manager or the like, for example, upon building of the communication system 1.

FIG. 5 is a diagram illustrating an example of a seismic intensity information database, according to an embodiment. The seismic intensity information database 25 holds area information identifying areas where tremors caused by the earthquake are estimated to occur, in association with the predicted values of the seismic intensities in the respective areas. For example, area codes may be used as the area information. For example, the seismic intensity information database 25 holds a table illustrated in FIG. 5, in which pieces of area information (for example, "X00", "X01", "X02", . . . ) identifying the areas where the tremors caused by the earthquake are estimated to occur are stored in association with the predicted values (for example, "6", "6", "5 Lower", . . . ) of the seismic intensities in the respective areas.

The seismic intensity information database 25 may further hold an earthquake ID (for example, "10012") for identifying each earthquake and the magnitude (for example, "7.2") indicating the magnitude of the each earthquake, as illustrated in FIG. 5. The content of the seismic intensity information database 25 is generated or updated by the processing unit 22 described below on the basis of the information included in the earthquake early warning received by the receiving unit 21.

FIG. 6 is a diagram illustrating an example of a service area identifier (SAI) information database, according to an embodiment. As depicted in FIG. 6, the SAI information database 26 holds service area identifiers (SAIs) identifying wireless communication areas, such as cells or sectors, provided by radio base stations installed around the plurality of communication paths between the relay apparatus 3 and the external network 6, in association with area information corresponding to the wireless communication areas. In other words, the area information may be identification information for identifying areas covered by the wireless communication areas provided by the radio base stations installed around at least one of the plurality of communication paths.

For example, the SAI information database 26 holds a table illustrated in FIG. 6, in which the SAIs (for example, "X0", "X1", "X2", . . . ) identifying the respective wireless communication areas are stored in association with the area information (for example, "X00", "X00, X01", "X02", . . . ) identifying areas corresponding to the respective wireless communication areas to which the SAIs are allocated.

The content of the SAI information database 26 is generated or updated by the system manager or the like, for example, upon building of the communication system 1.

The processing unit 22 generates the earthquake information including the predicted values of the seismic intensities in the respective areas through which the plurality of communication paths between the relay apparatus 3 and the external network 6 pass, based on the information included in the earthquake early warning received by the receiving unit 21 and the contents of the relay apparatus information database 24, the seismic intensity information database 25, and the SAI information database 26, described above.

For example, the processing unit 22 updates the content of the seismic intensity information database 25, based on the earthquake early warning received by the receiving unit 21. Then, the processing unit 22 extracts the SAIs corresponding to the area information included in the received earthquake early warning, based on the content of the SAI information database 26. Next, the processing unit 22 extracts the predicted values of the seismic intensities in the wireless communication areas corresponding to the extracted SAIs, based on the content of the seismic intensity information database 25, and generates the earthquake information including the predicted values of the seismic intensities in the respective wireless communication areas through which the plurality of communication paths between the relay apparatus 3 and the external network 6 pass.

Furthermore, the processing unit 22 notifies the relay apparatus 3 of the generated earthquake information via the transmitting unit 23, based on the content of the relay apparatus information database 24. The processing unit 22 may broadcast the generated earthquake information to the multiple relay apparatuses 3 or may selectively transmit the earthquake information based on the positional information that may be held in the relay apparatus information database 24. For example, the processing unit 22 may notify a relay apparatus 3 that is using a communication path passing through the wireless communication area where the tremor caused by the earthquake is estimated to occur, of the earthquake information, while may not notify a relay apparatus 3 that is using a communication path that does not pass through the wireless communication area where the tremor caused by the earthquake is estimated to occur, of the earthquake information.

The transmitting unit 23 may have a function to distribute the earthquake early warning to the user terminal 5, in addition to the function to transmit the earthquake information generated in the processing unit 22 to the relay apparatus 3.

(1.3) Example of Configuration of Relay Apparatus 3

Figures 7, 8:
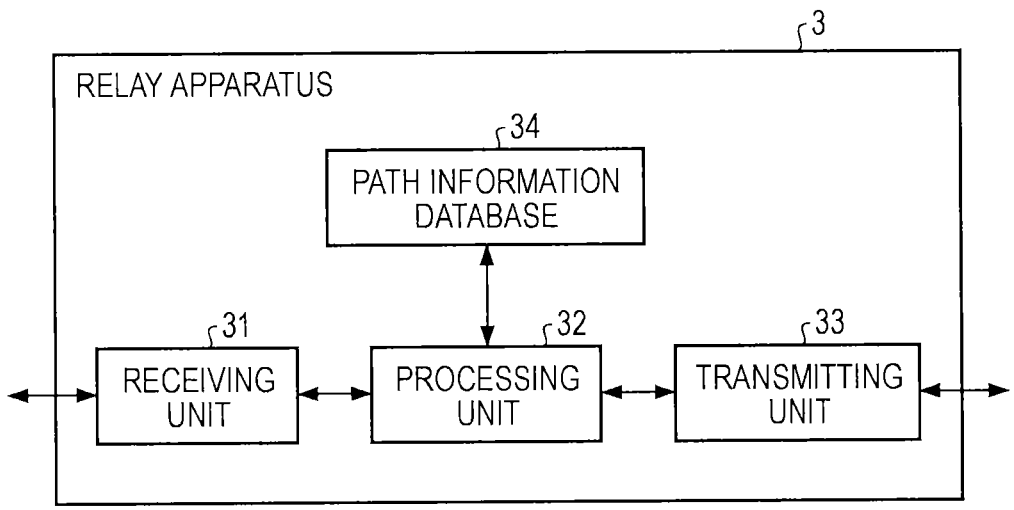
FIG. 7 is a diagram illustrating a configuration example of a relay apparatus, according to an embodiment.
FIG. 8 is a diagram illustrating an example of a path information database, according to an embodiment.

FIG. 7 is a diagram illustrating a configuration example of a relay apparatus, according to an embodiment. As illustrated in FIG. 7, the relay apparatus 3 may be configured to include a receiving unit 31, a processing unit 32, a transmitting unit 33, and a path information database 34.

The receiving unit 31 receives the earthquake information transmitted from the earthquake information notification apparatus 2. Further, the receiving unit 31 is configured to receive data, such as upstream user data and upstream control information, transmitted from the user terminal 5, and to receive data, such as downstream user data and downstream control data, transmitted from the external network 6.

The transmitting unit 33 is configured to transmit data, such as the upstream user data and the upstream control data, that have been transmitted from the user terminal 5, to the external network 6 via one of a plurality of communication paths, and to transmit data, such as the downstream user data and the downstream control data, that have been transmitted from the external network 6 via one of the plurality of communication paths, to the user terminal 5.

FIG. 8 is a diagram illustrating an example of a path information database, according to an embodiment. The path information database 34 holds, for each of the plurality of communication paths between the relay apparatus 3 and the external network 6, the SAIs identifying wireless communication areas (service areas) corresponding to areas through which each communication path passes. For example, the path information database 34 holds a table that at least stores, in association with each of communication path IDs (for example, "#1", "#2", "#3", . . . ) identifying the plurality of communication paths, the SAIs identifying the wireless communication areas through which the communication path identified by the each communication ID passes, as illustrated in FIG. 8.

The path information database 34 may further hold the priorities (for example, "0", "1", "2", . . . ) of the respective communication paths and the numbers of hops N (N is a natural number) (for example, "7", "8", "15", . . . ) of the respective communication paths, as illustrated in FIG. 8. The priority "0" indicates that the corresponding communication path is currently being used. A priority level at which a communication path is selected as a switching destination increases with decreasing value of the priority. The value of the priority of each communication path may be determined based on, for example, communication delay in the each communication path. The priority of the communication path is preferably set at a higher level with decreasing communication delay or with decreasing number of hops.

The example in FIG. 8 indicates that the communication path #1 is currently being used, has seven hops (relay nodes), and sequentially passes through wireless communication areas indicated by SAI: 10, SAI: 11, and so on. Similarly, the example in FIG. 8 indicates that the communication path #2 has a priority value of one, has eight hops, and sequentially passes through wireless communication areas indicated by SAI: 20, SAI: 21, and so on. The example in FIG. 8 indicates that the communication path #3 has a priority value of two, has 15 hops, and sequentially passes through wireless communication areas indicated by SAI: X0, SAI: X1, and so on.

The content of the path information database 34 is generated or updated, for example, by the system manager, upon building of the communication system 1.

The processing unit 32 determines, based on the earthquake information received by the receiving unit 31 and the content of the path information database 34, whether the predicted value of the seismic intensity in at least one of areas through which the currently-used communication path among the plurality of communication paths passes is higher than or equal to a predetermined threshold value.

When the processing unit 32 determines that the predicted value of the seismic intensity in at least one of areas through which the currently-used communication path passes is higher than or equal to the predetermined threshold value, the processing unit 32 searches the plurality of communication paths for an alternative communication path, that is, selects an alternative communication path from among the plurality of communication paths, and switches the currently-used communication path to the alternative communication path that has been searched for. The processing unit 32 preferably searches the plurality of communication paths for (selects), as an alternative communication path, a communication path that passes through only areas whose predicted values of the seismic intensities are lower than the predetermined threshold value.

In addition, the processing unit 32 preferably performs path-switching processing on the currently-used communication path before the principal motion of the earthquake occurs in at least one of areas through which the currently-used communication path passes. Furthermore, the processing unit 32 preferably searches for (selects), as an alternative communication path, for example, a communication path having a minimum communication delay or a communication path having the smallest number of hops.

As described above, the processing unit 32 determines whether the currently-used communication path is to be switched to an alternative communication path, based on the earthquake information received by the receiving unit 31 and the content of the path information database 34. When the processing unit 32 determines that the currently-used communication path is to be switched to the alternative communication path, the processing unit 32 performs path-switching processing on the currently-used communication path by switching the connection destinations of the receiving unit 31 and the transmitting unit 33.

Figure 9:
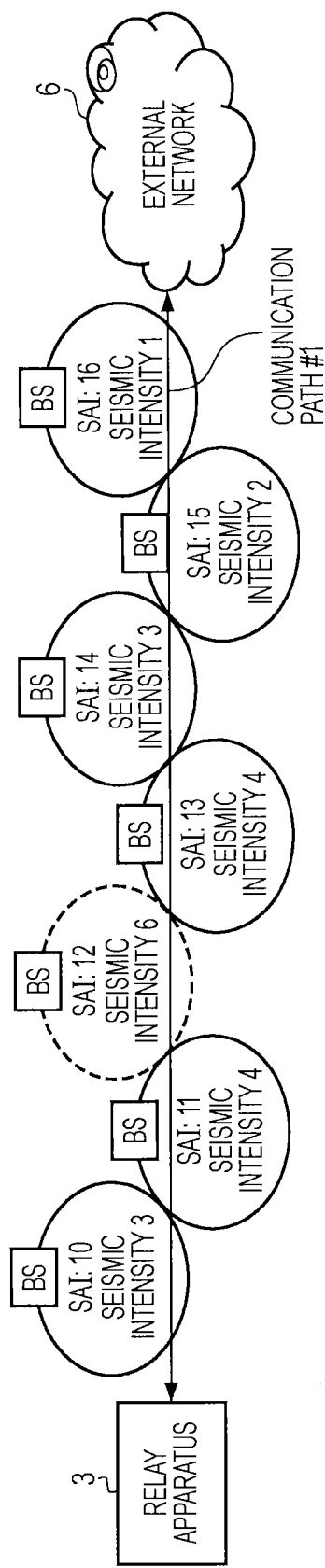
FIG. 9 is a schematic diagram illustrating an example of predicting an occurrence of a failure, according to an embodiment.

FIG. 9 is a schematic diagram illustrating an example of predicting an occurrence of a failure, according to an embodiment. For example, when the tremor of a seismic intensity of six, which is higher than a predetermined threshold value, for example, a seismic intensity of 5 Lower, is predicted to occur in an area of SAI: 12 during the communication via the communication path #1 passing through the wireless communication areas indicated by SAI: 10 to SAI: 16, as illustrated in FIG. 9, the relay apparatus 3 determines that there is a high probability that communication via the communication path #1 is disabled, and, for example, switches the currently-used communication path #1 to an alternative communication path passing through only areas in which tremor of a seismic intensity higher than or equal to a predetermined threshold value (for example, a seismic intensity of 5 Lower) is not predicted to occur, before the tremor actually occurs.

AS mentioned above, since an occurrence of a failure caused by an earthquake is predicted, and the currently-used communication path is switched in advance, it is possible to reduce the recovery time of the system. In addition, it is possible to avoid an occurrence of a system failure in advance. Furthermore, since the currently-used communication path is switched based on the failure prediction in the areas through which the currently-used communication path passes, it is possible to reduce the time to switch the currently-used communication path, compared with the path-switching processing performed based on the failure prediction in communication apparatuses through which the currently-used communication path passes.

When performing the path-switching processing mentioned above, the processing unit 32 may store, as backup data, the subscriber information that is held, for example, in the relay apparatus 3, the HLR, or the HSS, into a database apparatus positioned in an area other than a disaster-stricken area. This allows a missing list in widespread disaster to be created based on the subscriber information and to be used for salvation of missing persons.

(1.4) Exemplary Operation of a Communication System

Figure 10:
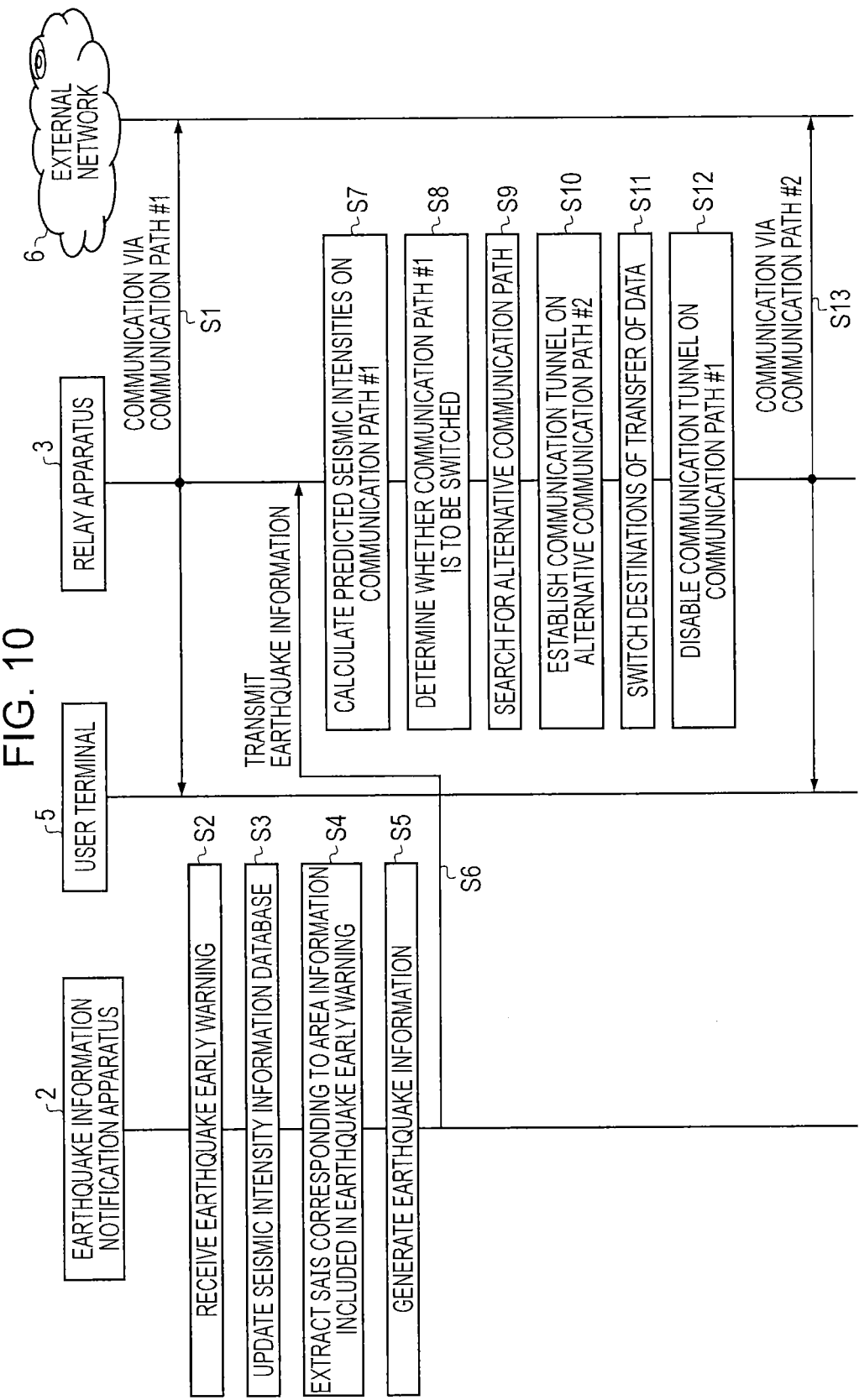
FIG. 10 is a diagram illustrating an example of an operational flowchart performed by a communication system, according to an embodiment.

FIG. 10 is a diagram illustrating an example of an operational flowchart performed by a communication system, according to an embodiment.

In operation S1, communication is established between the user terminal 5 and the external network 6 via a communication path #1 between the relay apparatus 3 and the external network 6.

In operation S2, upon occurrence of an earthquake, the earthquake information notification apparatus 2 receives an earthquake early warning from an earthquake early warning system 4.

In operation S3, the earthquake information notification apparatus 2 updates the seismic intensity information database 25, based on the received earthquake early warning.

In operation S4, the earthquake information notification apparatus 2 extracts SAIs identifying the wireless communication areas corresponding to areas indicated by the area information included in the received earthquake early warning, based on the content of the SAI information database 26.

In operation S5, the earthquake information notification apparatus 2 extracts the predicted values of the seismic intensities in the areas corresponding to the extracted SAIs, based on the seismic intensity information database 25, and generates the earthquake information including the predicted values of the seismic intensities in areas passed through by the plurality of communication paths between the relay apparatus 3 and the external network 6.

In operation S6, the earthquake information notification apparatus 2 transmits the generated earthquake information to the relay apparatus 3, based on the content of the relay apparatus information database 24.

In operation S7, the relay apparatus 3 acquires the predicted values of the seismic intensities in the wireless communication areas corresponding to areas through which the communication path #1 passes, based on the earthquake information received from the earthquake information notification apparatus 2 and the content of the path information database 34.

In operation S8, the relay apparatus 3 determines whether the communication path #1 is to be switched or not, by determining whether the predicted value of the seismic intensity in at least one of areas through which the communication path #1 passes is higher than or equal to a predetermined threshold value.

In operation S9, when the relay apparatus 3 determines that the predicted value of the seismic intensity in the at least one of the areas through which the communication path #1 passes is higher than or equal to the predetermined threshold value, the relay apparatus 3 searches the plurality of communication paths between the relay apparatus 3 and the external network 6 for an alternative communication path to which the currently-used communication path #1 is to be switched, that is, selects an alternative communication path from among the plurality of communication paths.

Figure 11:
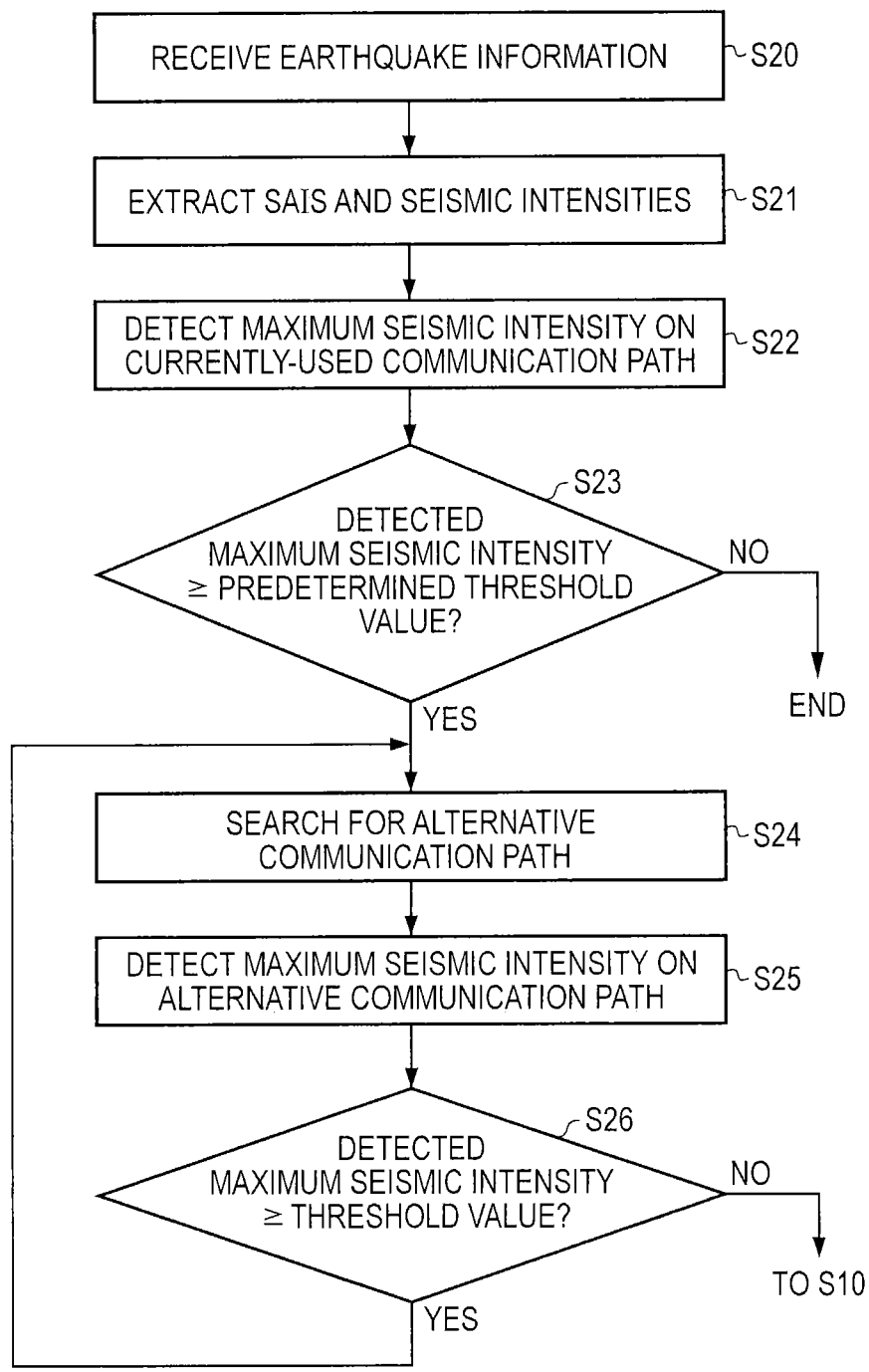
FIG. 11 is a diagram illustrating an example of an operational flowchart for determining whether to switch a communication path, according to an embodiment.

FIG. 11 is a diagram illustrating an example of an operational flowchart for determining whether to switch a communication path, according to an embodiment. FIG. 11 illustrates a more detailed example of operations S7 to S9 in FIG. 10.

In operation S20, the relay apparatus 3 receives earthquake information from the earthquake information notification apparatus 2.

In operation S21, the relay apparatus 3 extracts SAIs and predicted values of seismic intensities included in the received earthquake information.

In operation S22, the relay apparatus 3 detects the predicted value of the maximum seismic intensity in areas through which the communication path #1 passes, based on the SAIs and the predicted values of the seismic intensities extracted from the earthquake information and the content of the path information database 34.

Figure 12:
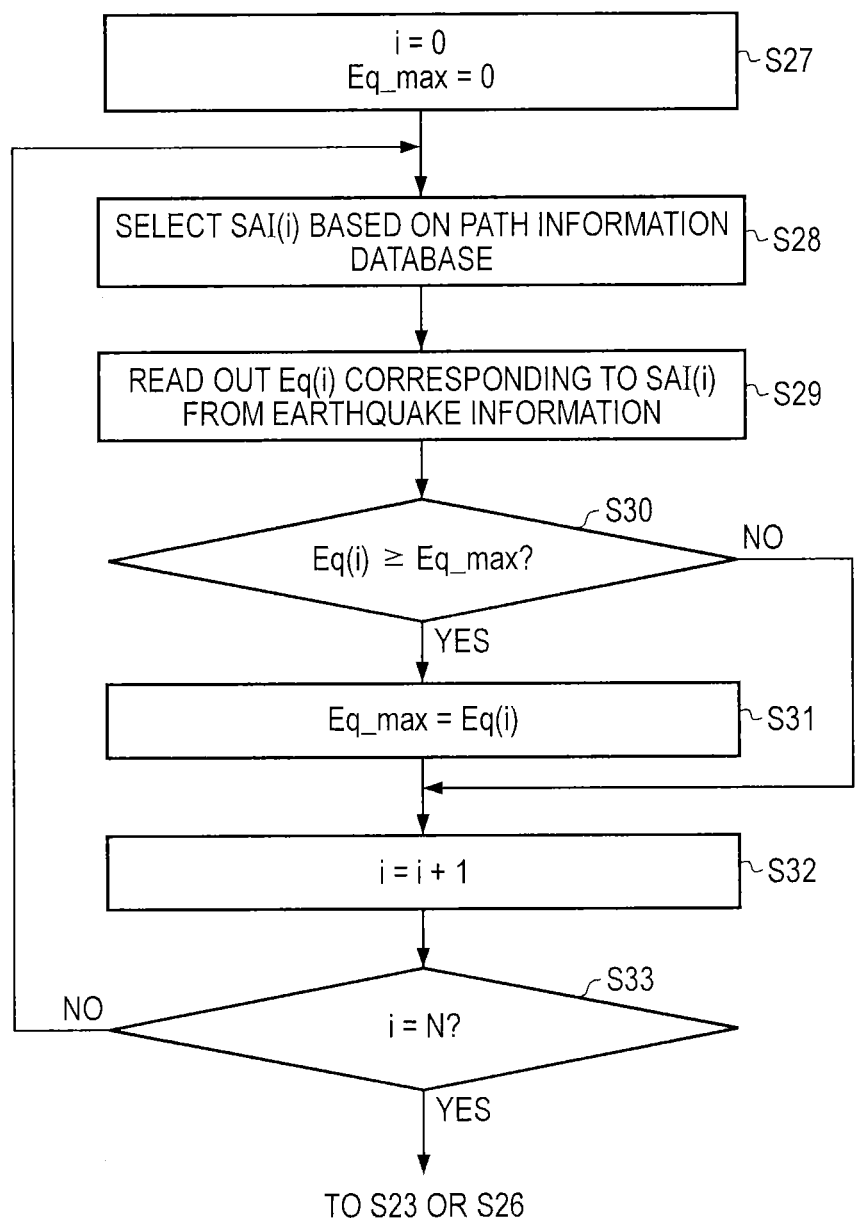
FIG. 12 is a diagram illustrating an example of an operational flowchart for detecting a maximum seismic intensity, according to an embodiment.

FIG. 12 is a diagram illustrating an example of an operational flowchart for detecting a maximum seismic intensity, according to an embodiment. FIG. 12 illustrates a more detailed example of operation S22 in FIG. 11.

In operation S27, the relay apparatus 3 set each of parameters i and Eq_max at a value of zero as an initial value. The parameter i identifies the SAI allocated to each of wireless communication areas through which the currently-used communication path passes, and parameter Eq_max indicates the predicted value of the maximum seismic intensity in the wireless communication areas through which the currently-used communication path passes.

In operation S28, the relay apparatus 3 selects SAI(i) from among the SAIs identifying the wireless communication areas through which the currently-used communication path #1 passes, based on the path information database 34.

In operation S29, the relay apparatus 3 reads out Eq(i) corresponding to the SAI(i) selected in operation S28, from the earthquake information, where the Eq(i) indicates the predicted value of the seismic intensity in the area corresponding to the SAI(i).

In operation S30, the relay apparatus 3 determines whether Eq(i) is higher than or equal to Eq_max. When Eq(i) is higher than or equal to Eq_max (YES in operation S30), the relay apparatus 3 assigns value Eq(i) to parameter Eq_max (in operation S31) and increments the parameter i by one (in operation S32). Meanwhile, when Eq(i) is lower than Eq_max (NO in operation S30), the relay apparatus 3 increments the parameter i by one by keeping the value of Eq_max (in operation S32).

In operation S33, the relay apparatus 3 determines whether the value of the parameter i is equal to the number of hops N on the communication path #1, based on the content of the path information database 34. When the value of the parameter i is equal to the number of hops N (YES in operation S33), the process goes to operation S23 or S26. Meanwhile, when the value of the parameter i is not equal to the number of hops N (NO in operation S33), the process goes back to operation S28 to repeat the processing of operations S28 to S33.

Referring back to FIG. 11, in operation S23, the relay apparatus 3 determines whether the predicted value of the maximum seismic intensity detected in operation S22 is higher than or equal to a predetermined threshold value. When the predicted value of the maximum seismic intensity detected in operation S22 is lower than the predetermined threshold value (NO in operation S23), the process is terminated, and the communication via the communication path #1 is continued.

Meanwhile, when the predicted value of the maximum seismic intensity detected in operation S22 is higher than or equal to the predetermined threshold value (YES in operation S23), the relay apparatus 3 searches the plurality of communication paths between the relay apparatus 3 and the external network 6 for an alternative communication path, that is, selects an alternative communication path from the plurality of communication paths (in operation S24). Then, in the following operations, the relay apparatus 3 determines the influence (risk) of the earthquake on the alternative communication path that is searched for (selected).

In operation S25, the relay apparatus 3 detects the predicted value of the maximum seismic intensity in the wireless communication area through which the alternative path passes, based on the received earthquake information and the content of the path information database 34.

In operation S26, the relay apparatus 3 determines whether the predicted value of the maximum seismic intensity detected in operation S25 is higher than or equal to the predetermined threshold value.

In the case, since the processing in operation S25 is similar to the detailed example of the processing in operation S22 illustrated in FIG. 12, a detailed description of operation S26 is omitted herein.

When the predicted value of the maximum seismic intensity detected in operation S25 is lower than the predetermined threshold value (NO in operation S26), the process goes to operation S10 in FIG. 10 so that the relay apparatus 3 continues the path-switching processing for switching the currently-used communication path #1 to the alternative communication path #2.

Meanwhile, when the predicted value of the maximum seismic intensity detected in operation S25 is higher than or equal to the predetermined threshold value (YES in operation S26), the process goes back to operation S24. Then, the relay apparatus 3 searches the plurality of communication paths between the relay apparatus 3 and the external network 6 for another alternative communication path, that is, selects another alternative communication path from the plurality of communication paths. Thereafter, the relay apparatus 3 performs operations S25 and S26 for the another alternative communication path that has been searched for. In other words, the processing in operations S24 to S26 is repeated until an alternative communication path on which occurrence of a failure caused by the earthquake is not predicted is found.

When an alternative communication path on which occurrence of a failure caused by the earthquake is not predicted has not been found among the plurality of communication paths between the relay apparatus 3 and the external network 6, the relay apparatus 3 may reset the predetermined threshold value at a higher value and may perform the processing in operations S22 to S26 again.

Referring back to FIG. 10, in operation S10, the relay apparatus 3 establishes a communication tunnel on the alternative communication path (the communication path #2) searched for in operation S9.

In operation S11, the relay apparatus 3 switches the connection destinations of the receiving unit 31 and the transmitting unit 33.

In operation S12, the relay apparatus 3 disables the communication tunnel established on the communication path #1 from which the alternative communication path #2 has been switched. In the operations mentioned above, at least the processing in operation S9 is preferably performed during a time period from when the relay apparatus 3 has received the earthquake information from the earthquake information notification apparatus 2 to when the tremor actually reaches the wireless communication areas in which seismic intensities higher than or equal to the predetermined threshold value is predicted to occur.

In operation S13, after the switching of the currently-used communication path is performed by the relay apparatus 3, communication via the communication path #2 is performed between the user terminal 5 and the external network 6.

As described above, according to the communication system, the relay apparatus, the earthquake information notification apparatus, and the path switching method of the above embodiments, since an occurrence of a failure caused by an earthquake is predicted and the currently-used communication path is switched in advance, it is possible to reduce the recovery time of the system. Further, it is possible to avoid an occurrence of a system failure in advance.

Furthermore, since the currently-used communication path is switched based on the failure prediction in areas through which the currently-used communication path pass, it is possible to reduce the time to switch the currently-used communication path, compared with the path switching based on the failure prediction in communication apparatuses through which the currently-used communication path passes.

The subscriber information held in the HLR, HSS, or the like may be saved in, for example, a database apparatus positioned in an area other than a disaster-stricken area when the currently-used communication path is switched. In this case, it is possible to create a missing list in widespread disaster, based on the subscriber information, and to use the missing list for salvation of missing persons.

[2] First Modification

Figure 13:
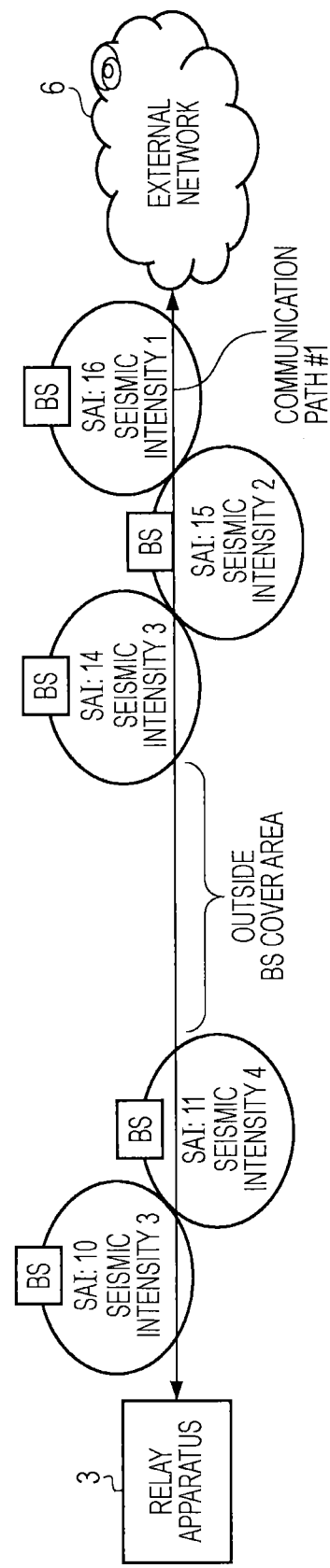
FIG. 13 is a schematic diagram illustrating an example of predicting an occurrence of a failure, according to an embodiment.

Although, in the above examples, occurrences of failures caused by an earthquake in areas through which the currently-used communication path passes are predicted based on the SAIs identifying the wireless communication areas corresponding to the areas in which tremors caused by the earthquake are predicted to occur, there may be cases where the wireless communication areas corresponding to the areas through which the currently-used communication path passes are not be deployed. For example, the communication path #1 between the relay apparatus 3 and the external network 6 may pass through areas outside the range covered by the wireless communication areas provided by adjacent radio base stations, as illustrated in FIG. 13. The areas outside the range covered by the wireless communication areas may include an area in which the installation density of the radio base stations is low, in addition to mountain regions and ocean regions.

In such a case, for example, the processing unit 22 in the earthquake information notification apparatus 2 generates dummy service area identifiers for identifying dummy wireless communication areas corresponding to the area information included in the earthquake early warning and earthquake information including the predicted values of the seismic intensities in the corresponding areas, and transmits the generated dummy service area identifiers and earthquake information to the relay apparatus 3.

The relay apparatus 3 determines whether the predicted value of the seismic intensity in at least one of the wireless communication areas and the dummy wireless communication areas, through which the currently-used communication path passes, is higher than or equal to a predetermined threshold value, based on the received earthquake information.

Then, the relay apparatus 3 switches the currently-used communication path when the relay apparatus 3 determines that the predicted value of the seismic intensity in at least one of the wireless communication areas and the dummy wireless communication areas, through which the currently-used communication path passes, is higher than or equal to the predetermined threshold value. As a result, it is possible to achieve advantages similar to those in the exemplary embodiments described above even when a communication path between the relay apparatus 3 and the external network 6 passes through areas outside the range covered by the wireless communication areas provided by the adjacent radio base station.

[3] Second Modification

The degree of the tremor caused by an earthquake may vary depending on the geographical feature or the conditions of the ground of each area. In other words, the influence on the communication path and the communication apparatus may vary depending on the geographical feature or the conditions of the ground of each area even when the same seismic intensity is predicted. Accordingly, for example, the relay apparatus 3 may apply a weighting factor corresponding to the geographical feature or the conditions of the ground of each area to the predicted value of the seismic intensity in the each area, and may switch the currently-used communication path, based on the predicted values of the seismic intensities to which the weighting factors have been applied.

FIG. 14 is a diagram illustrating an example of a path information database, according to an embodiment. The path information database 34 illustrated in FIG. 14 may be configured to further include a weighting factor $Gd(i)$ for each of wireless communication areas, in addition to the content illustrated in FIG. 8. The value of the weighting factor $Gd(i)$ is set in accordance with, for example, the geographical feature and the conditions of the ground of the area corresponding to each wireless communication area. For example, when the corresponding wireless communication area is in a flat region, $Gd(i)$ may be set at 1.0 so that the predicted seismic intensity is applied as it is. When the corresponding wireless communication area is in a mountain region, $Gd(i)$ may be set at 1.1 on the assumption that damage more serious than that caused by the predicted seismic intensity is expected. When the corresponding wireless communication area is in an ocean region, $Gd(i)$ may be set at 1.3 on the assumption that a damage much more serious than that caused by the predicted seismic intensity is expected.

Figure 15:
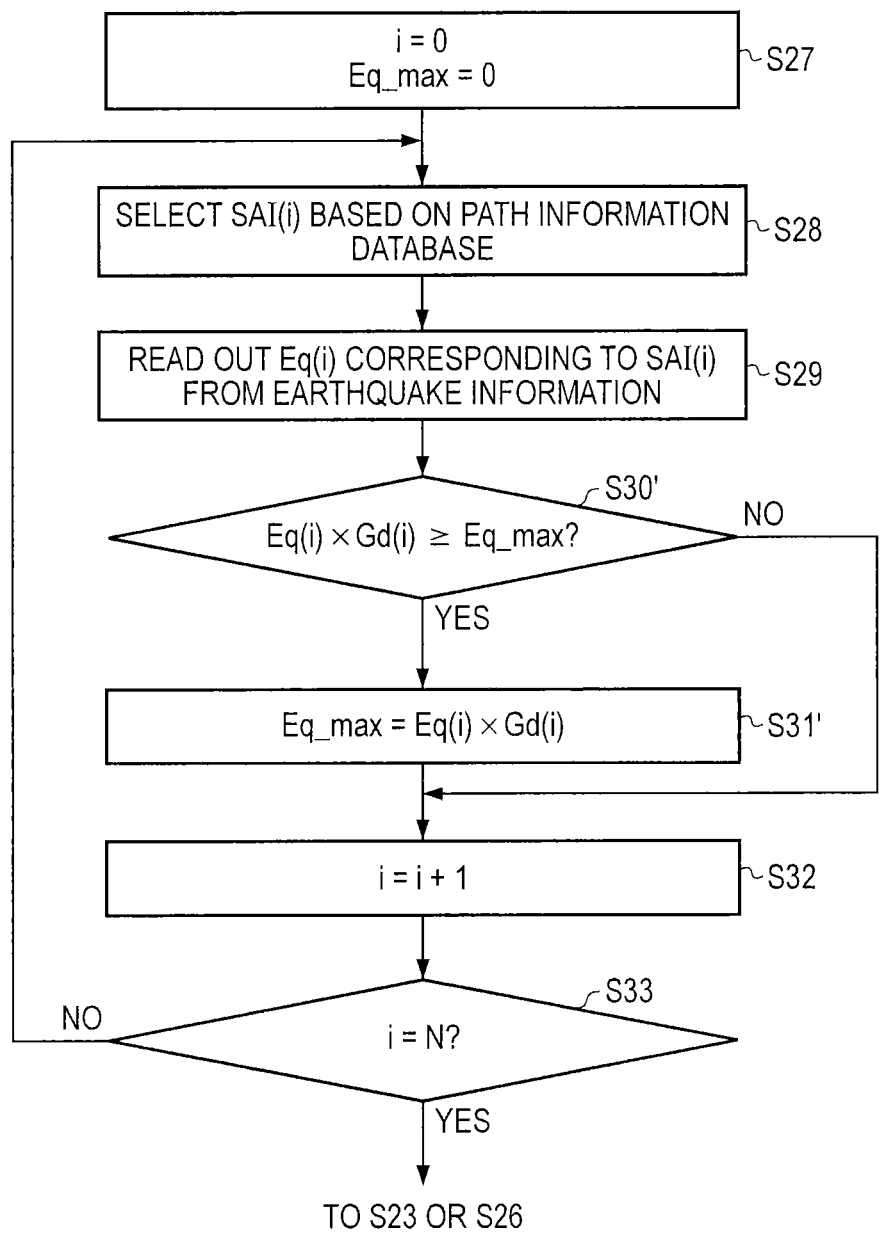
FIG. 15 is a diagram illustrating an example of an operational flowchart performed by a relay apparatus, according to an embodiment.

FIG. 15 is a diagram illustrating an example of an operational flowchart performed by a relay apparatus, according to an embodiment. As illustrated in FIG. 15, the relay apparatus 3 performs operations similar to those depicted in FIG. 12 except that operations S30' and S31' are performed in FIG. 15 instead of operations S30 and S31 in FIG. 12. That is, in operation S30', the relay apparatus 3 determines whether $Eq(i) \times Gd(i)$ is higher than or equal to $Eq\_max$. When $Eq(i) \times Gd(i)$ is higher than or equal to $Eq\_max$ (YES in operation S30'), in operation S31', the relay apparatus 3 assigns $Eq(i) \times Gd(i)$ to $Eq\_max$.

In other words, the relay apparatus 3 applies a weighting factor corresponding to the geographical feature or the conditions of the ground, to the predicted value of the seismic intensity in each area, and determines whether the predicted value of the seismic intensity, to which the weighting factor has been applied, in at least one of the areas through which the currently-used communication path passes is higher than or equal to a predetermined threshold value. The relay apparatus 3 switches the currently-used communication path when the relay apparatus 3 determines that the predicted value of the seismic intensity, to which the weighting factor has been applied, in at least one of the areas through which the currently-used communication path passes is higher than or equal to the predetermined threshold value.

With the above method, since the degree of any damage on a communication path is accurately determined in accordance with the geographical feature or the conditions of the ground of each area, it is possible to more accurately predict the failure, in addition to advantages similar to those of the exemplary embodiments described above.

[4] Examples of Hardware Configuration

Figure 16:
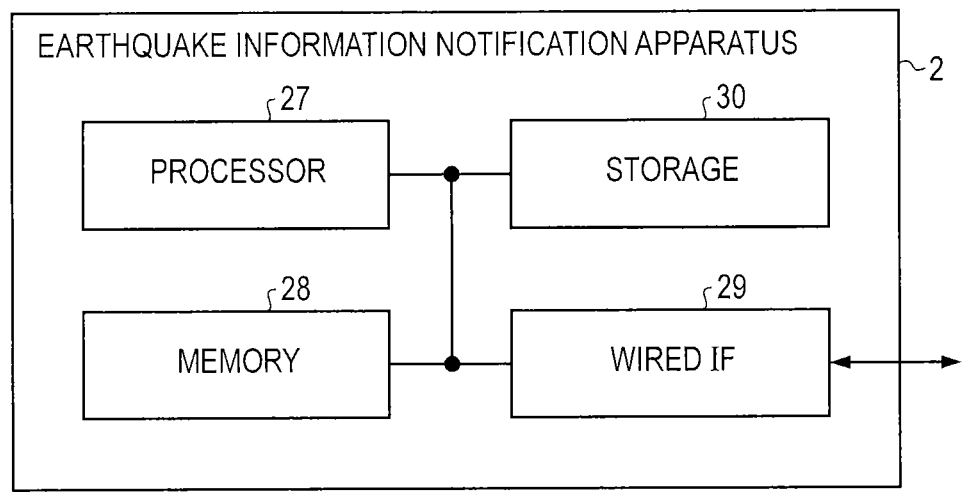
FIG. 16 is a diagram illustrating an example of a hardware configuration of an earthquake information notification apparatus, according to an embodiment.

FIG. 16 is a diagram illustrating an example of a hardware configuration of an earthquake information notification apparatus, according to an embodiment. As depicted in FIG. 16, the earthquake information notification apparatus 2 may be configured to include, for example, a processor 27, a memory 28, a wired interface (wired IF) 29, and a storage 30. The wired IF 29 is, for example, an interface apparatus used to communicate with the earthquake early warning system 4 and the relay apparatus 3. The processor 27 is an apparatus that processes data and is, for example, a central processing unit (CPU) or a digital signal processor (DSP).

The memory 28 and the storage 30 are apparatuses that store data and include, for example, a read only memory (ROM), a random access memory (RAM), and a hard disk drive (HDD).

The components in the earthquake information notification apparatus 2 illustrated in FIG. 3 may be associated with the components in the earthquake information notification apparatus 2 illustrated in FIG. 16, for example, as described below.

The wired IF 29 corresponds to, for example, the receiving unit 21 and the transmitting unit 23. The processor 27, the memory 28, and the storage 30 correspond to, for example, the processing unit 22. The memory 28 and the storage 30 correspond to, for example, the relay apparatus information database 24, the seismic intensity information database 25, and the SAI information database 26.

Figure 17:
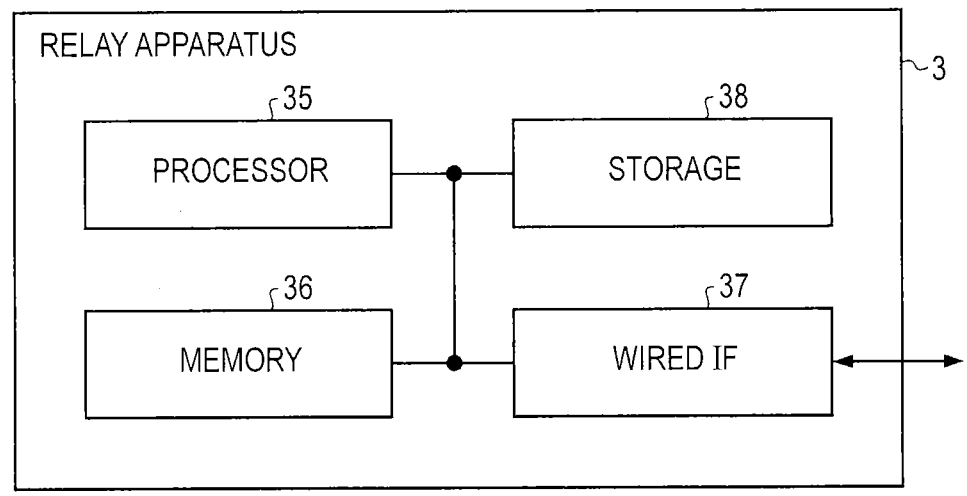
FIG. 17 is a diagram illustrating an example of a hardware configuration of a relay apparatus, according to an embodiment.

FIG. 17 is a diagram illustrating an example of a hardware configuration of a relay apparatus, according to an embodiment. As depicted in FIG. 17, the relay apparatus 3 may be configured to include, for example, a processor 35, a memory 36, a wired interface (wired IF) 37, and a storage 38. The wired IF 37 is, for example, an interface apparatus that communicates with the earthquake information notification apparatus 2, the external network 6, and the user terminal 5. The processor 35 is an apparatus that processes data and is, for example, a CPU or a DSP.

The memory 36 and the storage 38 are apparatuses that store data and include, for example, a ROM, a RAM, and an HDD.

The components in the relay apparatus 3 illustrated in FIG. 7 may be associated with the components in the relay apparatus 3 illustrated in FIG. 17, for example, as described below.

The wired IF 37 corresponds to, for example, the receiving unit 31 and the transmitting unit 33. The processor 35, the memory 36, and the storage 38 correspond to, for example, the processing unit 32. The memory 36 and the storage 38 correspond to, for example, the path information database 34.

The configurations and the functions of the earthquake information notification apparatus 2 and the relay apparatus 3 in the exemplary embodiments and the modifications described above may be appropriately omitted or left or may be appropriately combined. In other words, the configurations and the functions described above may be appropriately omitted or left or may be appropriately combined so as to achieve the functions of the present disclosure.

For example, the configuration of the communication system 1 illustrated in FIG. 2 is only an example and the relay apparatus 3 may not be arranged at the position in the example in FIG. 2. For example, any one of the radio base station, the OLT, and the gateway apparatus may be configured to have the functions of the relay apparatus 3. In this case, the relay apparatus 3 may not be included in the communication system 1.

Although, in the exemplary embodiments and the modifications described above, the currently-used communication path is switched so as to avoid the areas where failures caused by an earthquake are predicted to occur, the currently-used communication path may be switched so as to avoid the areas where failures caused by disasters, such as a tsunami (seismic sea waves), a fire disaster, or a flood, are predicted to occur.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system for switching a communication path based on disaster information, the apparatus comprising:
   a relay apparatus to transfer data sent from a user terminal, to an external network, via any one of a plurality of communication paths; and
   an information notification apparatus to transmit, when a disaster has occurred, information on the occurred disaster to the relay apparatus, wherein
   the information notification apparatus is configured:
      to receive first disaster information including area information and prediction information, the area information identifying first areas that are forecast to be affected by an occurrence of the disaster, the prediction information storing, in association with each of the first areas, a predicted intensity value indicating a predicted value of an influence degree of the disaster on the each of the first areas,
      to generate, based on the received first disaster information, second disaster information storing the predicted intensity value for the disaster in association with each of second areas that are included in the first areas and are passed through by the plurality of communication paths, and
      to transmit the generated second disaster information to the relay apparatus; and
   the relay apparatus is configured:
      to receive the second disaster information,
      to determine, based on the received second disaster information, whether or not a first predicted intensity value associated with at least one of third areas is greater than or equal to a predetermined threshold value, the third areas being areas passed through by a first communication path that is currently used one of the plurality of communication paths, and
      to switch the first communication path to a second communication path that is alternative one of the plurality of communication paths when it is determined that the first predicted intensity value is greater than or equal to the predetermined threshold value.

2. The system of claim 1, wherein
the information notification apparatus generates, based on the received first disaster information, the second disaster information that stores service area identifiers identifying wireless communication areas corresponding to the second areas, together with the predicted intensity values associated with the second areas;

the relay apparatus determines, based on the second disaster information, whether or not a second predicted intensity value associated with at least one of wireless communication areas corresponding to the third areas is greater than or equal to the predetermined threshold value; and the relay apparatus switches the first communication path to the second communication path when it is determined that the second predicted intensity value is greater than or equal to the predetermined threshold value.

3. The system of claim 2, wherein
the information notification apparatus detects wireless communication areas corresponding to the third areas, from among areas covered by wireless communication areas that are provided by base stations arranged at a periphery of the first communication path.

4. The system of claim 1, wherein
a communication path passing through only areas whose the predicted intensity values are smaller than the predetermined threshold value is selected as the second communication path from among the plurality of communication paths.

5. The system of claim 1, wherein
the disaster is an earthquake that causes a minor initial tremor and a principal motion where a propagation velocity of the minor initial tremor is greater than a propagation velocity of the principal motion, and the predicted intensity value indicates predicted seismic intensity of the earthquake; and the relay apparatus switch the first communication path to the second communication path based on the second disaster information before the principal motion arrives at at least one of the third areas.

6. The system of claim 2, wherein
when there exist fourth areas that are included in the second areas and not covered by any wireless communication area, the information notification apparatus generates the second disaster information that includes the service area identifiers identifying dummy wireless communication areas corresponding to the fourth areas together with the predicted intention values associated with the second areas;

the relay apparatus determines, based on the second disaster information, whether or not a third predicted intensity value associated with at least one of wireless communication areas and dummy wireless communication areas corresponding to the third areas is greater than or equal to the predetermined threshold value; and the relay apparatus switches the first communication path to the second communication path when it is determined that the third predicted intensity value is greater than or equal to the predetermined threshold value.

7. The system of claim 1, wherein
the relay apparatus generates a second predicted intensity value by applying, to the first predicted intensity value of each of the first areas, a weighting factor depending on a geographical feature or a land condition of the each of the first areas;

the relay apparatus determines whether or not the second predicted intensity value associated with at least one of the third areas is greater than or equal to the predetermined threshold value; and the relay apparatus switches the first communication path to the second communication path when it is determined that the second predicted intensity value is greater than or equal to the predetermined threshold value.

8. The system of claim 1, wherein
the disaster is an earthquake that causes a minor initial tremor and a principal motion where a propagation velocity of the minor initial tremor is greater than that of the principal motion, and the predicted intensity value indicates predicted seismic intensity of the earthquake; and the first disaster information is generated by observing the minor initial tremor caused by the earthquake.

9. An apparatus for relaying data transmitted from a user terminal to an external network via any one of a plurality of communication paths, the apparatus comprising:
a memory to store information on the plurality of communication paths; and
a processor configured:
to receive disaster information storing a predicted intensity value of a disaster in association with each of first areas that are passed through by the plurality of communication paths,
to determine, based on the received disaster information, whether or not a first predicted intensity value associated with at least one of second areas is greater than or equal to a predetermined threshold value, the second areas being areas passed through by a first communication path that is currently used one of the plurality of communication paths, and
to switch the first communication path to a second communication path that is alternative one of the plurality of communication paths when it is determined that the first predicted intensity value is greater than or equal to the predetermined threshold value.

10. An apparatus for transmitting disaster information to a relay apparatus for relaying data transmitted from a user terminal to an external network via any one of a plurality of communication paths, the apparatus comprising:
a processor configured:
to receive first disaster information including area information and prediction information, the area information identifying first areas that are forecast to be affected by an occurrence of the disaster, the prediction information storing, in association with each of the first areas, a predicted intensity value indicating a predicted value of an influence degree of the disaster on the each of the first areas,
to generate, based on the received first disaster information, second disaster information storing the predicted intensity value for the disaster in association with each of second areas that are included in the first areas and are passed through by the plurality of communication paths, and
to transmit the generated second disaster information to the relay apparatus; and
a memory to store information on the relay apparatus.

11. A method for switching a communication path among a plurality of communication paths based on disaster information, the method being performed by a system including a relay apparatus and an information notification apparatus, the relay apparatus relaying data sent from a user terminal to an external network via any one of the plurality of communication paths, the information notification apparatus transmitting the disaster information to the relay apparatus when a disaster has occurred, the method comprising:
receiving, by the information notification apparatus, first disaster information including area information and prediction information, the area information identifying first areas that are forecast to be affected by an occurrence of the disaster, the prediction information storing, in association with each of the first areas, a predicted intensity value indicating a predicted value of an influence degree of the disaster on the each of the first areas;

generating, by the information notification apparatus, based on the received first disaster information, second disaster information storing the predicted intensity value for the disaster in association with each of second areas that are included in the first areas and are passed through by the plurality of communication paths;

determining, by the relay apparatus, based on the second disaster information received from the information notification apparatus, whether or not a first predicted intensity value associated with at least one of third areas is greater than or equal to a predetermined threshold value, the third areas being areas passed through by a first communication path that is currently used one of the plurality of communication paths, and switching, by the relay apparatus, the first communication path to a second communication path that is alternative one of the plurality of communication paths when it is determined that the first predicted intensity value is greater than or equal to the predetermined threshold value.

* * * * *